US011171525B2

United States Patent
Hasegawa

(10) Patent No.: US 11,171,525 B2
(45) Date of Patent: Nov. 9, 2021

(54) ROTOR AND PERMANENT MAGNET ELECTRIC MOTOR

(71) Applicant: FUJITSU GENERAL LIMITED, Kanagawa (JP)

(72) Inventor: Tomooki Hasegawa, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 0 days.

(21) Appl. No.: 16/282,801

(22) Filed: Feb. 22, 2019

(65) Prior Publication Data

US 2019/0190331 A1    Jun. 20, 2019

Related U.S. Application Data

(63) Continuation of application No. 15/336,001, filed on Oct. 27, 2016, now Pat. No. 10,256,684.

(30) Foreign Application Priority Data

Oct. 29, 2015   (JP) ................................ 2015-213365

(51) Int. Cl.
*H02K 1/27* (2006.01)
*H02K 1/14* (2006.01)
*H02K 3/18* (2006.01)

(52) U.S. Cl.
CPC .......... *H02K 1/2706* (2013.01); *H02K 1/146* (2013.01); *H02K 1/276* (2013.01); *H02K 3/18* (2013.01); *H02K 2213/03* (2013.01)

(58) Field of Classification Search
CPC ...... H02K 1/2706; H02K 1/276; H02K 1/146; H02K 3/18; H02K 2213/03; H02K 21/16; H02K 2201/03

(Continued)

(56) References Cited

U.S. PATENT DOCUMENTS 7,432,624 B2   10/2008  Kolehmainen et al.
7,868,502 B2 *  1/2011  Lee ....................... H02K 1/276
                                                        310/156.56

(Continued)

FOREIGN PATENT DOCUMENTS

CN    101326699 A    12/2008
CN    201167256 Y    12/2008

(Continued)

OTHER PUBLICATIONS

Decision of Refusal issued in corresponding Japanese Patent Application No. 2015-213365, dated Aug. 27, 2019, with English translation.

(Continued)

*Primary Examiner* — John K Kim
(74) *Attorney, Agent, or Firm* — McDermott Will & Emery LLP

(57) ABSTRACT

A rotor, which is cylindrically formed of a magnetic body and in which a plurality of magnet embedding holes are annularly formed at predetermined intervals in a circumferential direction, plate-like permanent magnets being embedded in the magnet embedding holes, includes a flux barrier that is disposed toward an outer circumference of the rotor from an circumferential end of each of the magnet embedding holes, and a slit that is disposed to be adjacent to the flux barrier, in which the slit is a long hole extending in a direction of becoming distant from the flux barrier, from an inner circumferential side of the rotor toward an outer circumferential side thereof, and a notch portion is provided on the outer circumference of the rotor opposing the flux barrier in a diameter direction of the rotor.

7 Claims, 18 Drawing Sheets

(58) Field of Classification Search
USPC .................................. 310/156.53, 156.56
See application file for complete search history.

(56) References Cited

U.S. PATENT DOCUMENTS

| | | | | |
|---|---|---|---|---|
| 8,772,994 | B2* | 7/2014 | Feng | H02K 1/276 310/156.53 |
| 8,853,909 | B2* | 10/2014 | Aota | H02K 1/276 310/156.53 |
| 9,184,636 | B2* | 11/2015 | Aoyama | H02K 1/2706 |
| 10,256,684 | B2* | 4/2019 | Hasegawa | H02K 3/18 |
| 2004/0256940 | A1* | 12/2004 | Tsuruta | H02K 1/276 310/156.53 |
| 2007/0126305 | A1 | 6/2007 | Okuma et al. | |
| 2009/0026865 | A1 | 1/2009 | Aota et al. | |
| 2009/0184597 | A1* | 7/2009 | Lee | H02K 1/276 310/156.56 |
| 2010/0052455 | A1* | 3/2010 | Feng | H02K 29/03 310/156.08 |
| 2012/0133239 | A1* | 5/2012 | Taema | H02K 21/16 310/216.094 |
| 2017/0126080 | A1 | 5/2017 | Hasegawa | |
| 2019/0190331 | A1* | 6/2019 | Hasegawa | H02K 1/146 |

FOREIGN PATENT DOCUMENTS

| | | |
|---|---|---|
| CN | 102487224 A | 6/2012 |
| CN | 202353346 U | 7/2012 |
| CN | 203119644 U | 8/2013 |
| CN | 104158322 A | 11/2014 |
| DE | 19851883 A1 | 5/2000 |
| EP | 2083503 A2 | 7/2009 |
| JP | 2007-174738 A | 7/2007 |
| JP | 2010-158085 A | 7/2010 |
| JP | 2011-097754 A | 5/2011 |
| JP | 2012-120326 A | 6/2012 |
| JP | 2012-217249 A | 11/2012 |
| JP | 2012-217251 A | 11/2012 |

OTHER PUBLICATIONS

Decision of Dismissal of Amendment issued in corresponding Japanese Patent Application No. 2015-213365, dated Aug. 27, 2019, with English translation.
First Office Action issued in corresponding Chinese Application No. 201610961093.3, dated Aug. 22, 2019, with English translation.
Japanese Notice of Reasons for Refusal issued in corresponding Japanese Patent Application No. 2015-213365, dated May 14, 2019, with English Translation.
Office Action issued in corresponding European Application No. 16196297.2, dated Aug. 16, 2019.
Extended European Search Report issued in corresponding European Patent Application No. 16196297.2, dated Mar. 16, 2017.
U.S. Non-Final Office Action issued in related parent U.S. Appl. No. 15/336,001, dated Jul. 11, 2018.
U S. Notice of Allowance issued in related parent U.S. Appl. No. 15/336,001, dated Nov. 23, 2018.

* cited by examiner

ROTOR AND PERMANENT MAGNET ELECTRIC MOTOR

CROSS-REFERENCE TO RELATED APPLICATION

This application is a Continuation of U.S. patent application Ser. No. 15/336,001, filed on Oct. 27, 2016, which claims the benefit of priorities from Japanese Patent Application No. 2015-213365 filed on Oct. 29, 2015; the entire contents of which are incorporated herein by reference.

FIELD

The present invention relates to a rotor and a permanent magnet electric motor.

BACKGROUND

In the related art, there is a magnet embedded rotor including a notch portion that is located on an outer circumference between salient poles adjacent to each other; a bridge that is located between the notch portion and a nonmagnetic portion; and a first protrusion that protrudes outward from the center of the notch portion, in which a radius of each of the salient poles gradually decreases from the center of the salient pole toward the notch portion, and a radius of the first protrusion is the same as a radius of the center of each of the salient pole (refer to JP-A-2012-120326).

In the magnet embedded rotor disclosed in JP-A-2012-120326, as illustrated in FIG. 14A, notch portions 217a and 216b, and a first protrusion 218a protruding outward from the center between the notch portion 217a and the notch portion 216b are formed on an outer circumference between salient poles 211 and 212 of a rotor 210 adjacent to each other. Consequently, an induced voltage waveform generated from permanent magnets 213 and 214 becomes similar to a sine wave since harmonic components are reduced. Therefore, cogging torque is reduced, and thus vibration or noise of an electric motor is reduced. However, in FIG. 14B illustrating an induced voltage waveform when the rotor illustrated in FIG. 14A rotates, two horns appear around each of a peak and a bottom. Consequently, the induced voltage waveform becomes similar to a sine wave, but harmonic components of an induced voltage or cogging torque is not sufficiently reduced and thus still remains, and vibration or noise of the electric motor is required to be further reduced.

SUMMARY

The present invention has been made in consideration of these circumstances, and an object thereof is to provide a rotor and a permanent magnet electric motor which can minimize uneven rotation during rotation of a rotor by reducing harmonic components of an induced voltage or cogging torque during the rotation of the rotor. As a result, it is possible to provide a rotor and a permanent magnet electric motor capable of preventing vibration or noise.

In order to solve the above-described problems and to achieve the object, according to the present invention, there is provided a rotor which is cylindrically formed of a magnetic body and in which a plurality of magnet embedding holes are annularly formed at predetermined intervals in a circumferential direction, plate-like permanent magnets being embedded in the magnet embedding holes, the rotor including a first nonmagnetic portion that is disposed toward an outer circumference of the rotor from an circumferential end of each of the magnet embedding holes; and a second nonmagnetic portion that is disposed to be adjacent to the first nonmagnetic portion. The second nonmagnetic portion is a long hole extending in a direction of becoming distant from the first nonmagnetic portion, from an inner circumferential side of the rotor toward an outer circumferential side thereof, and a notch portion is provided on the outer circumference of the rotor opposing the first nonmagnetic portion in a diameter direction of the rotor.

In the rotor according to the present invention, the second nonmagnetic portion may be formed by bending an outer circumferential side end of the long hole along the outer circumference of the rotor in a direction of becoming distant from the first nonmagnetic portion.

In the rotor according to the present invention, an angle of the notch portion may match a bent angle of the outer circumferential side end of the second nonmagnetic portion.

In the rotor according to the present invention, in a case where a gap between the first nonmagnetic portion and the notch portion is indicated by t, and a gap between the second nonmagnetic portion and the outer circumference of the rotor is indicated by T, the following expression may be satisfied:

$$1.5t \leq T \leq 2.5t$$

According to the present invention, there is provided a permanent magnet electric motor including the rotor; and a yoke teeth stator that is disposed on the outer circumferential side of the rotor and in which conductive wires are respectively wounded on a plurality of teeth extending toward the inner circumferential side from an annular yoke.

According to the present invention, it is possible to minimize uneven rotation by minimizing harmonic components of an induced voltage or cogging torque when a rotor rotates. As a result, it is possible to achieve an effect of being capable of preventing vibration or noise when the rotor rotates.

DESCRIPTION OF EMBODIMENTS

Hereinafter, Examples of a rotor and a permanent magnet electric motor according to the present invention will be described in detail with reference to the drawings. The present invention is not limited to the Examples.

EXAMPLES

Figure 1:
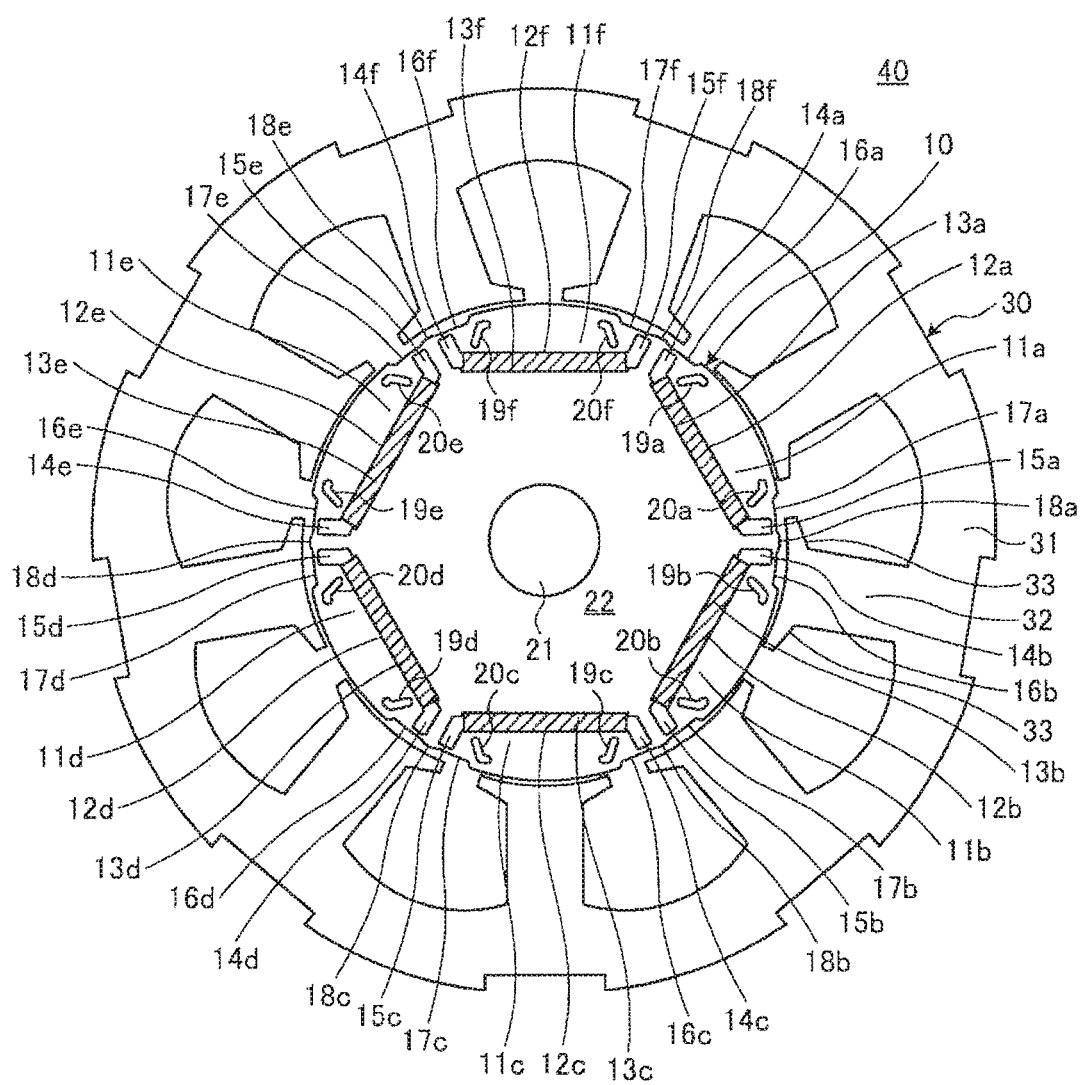
FIG. 1 is a plan view illustrating a configuration of a permanent magnet electric motor according to the present example.
Figure 2A:
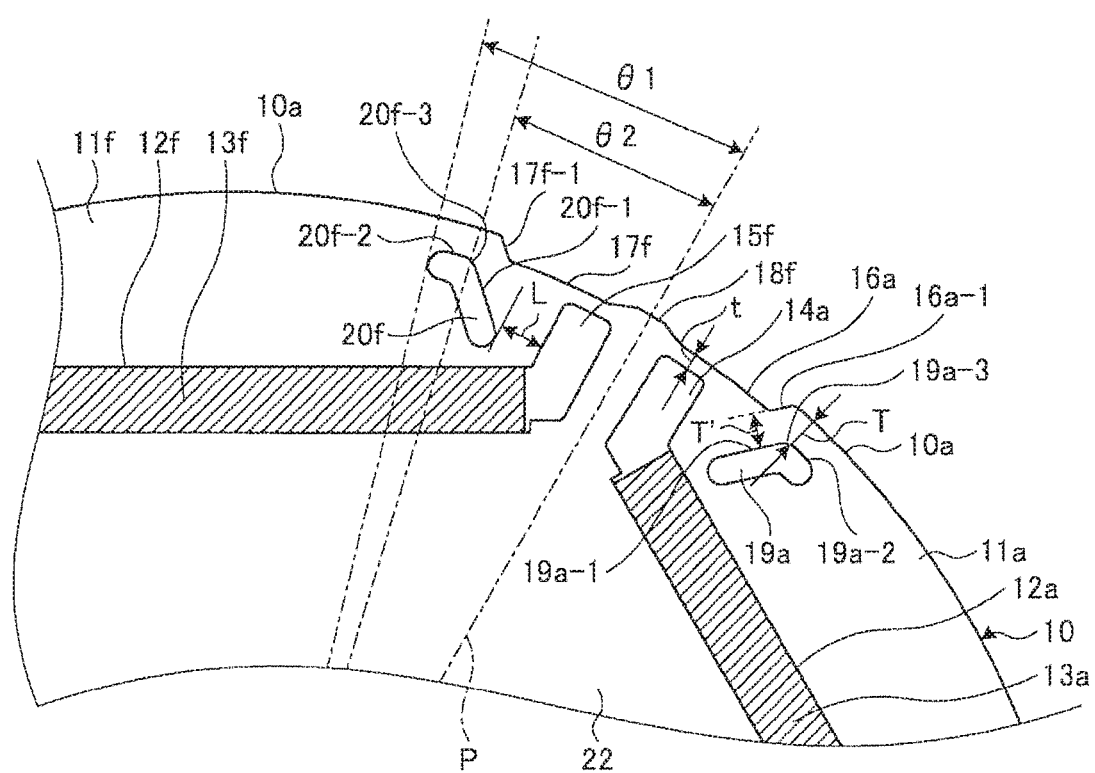
FIG. 2A is an enlarged view of an inter-pole portion of a rotor illustrated in FIG. 1.
Figure 2B:
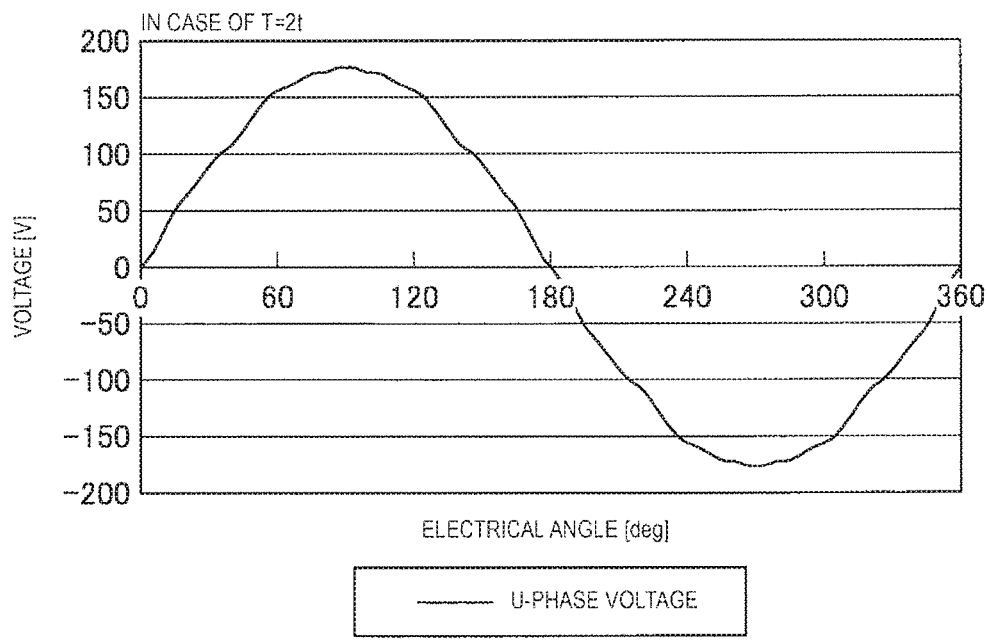
FIG. 2B is an induced voltage waveform diagram in a case where a slit and a flux barrier of the rotor are formed at a position satisfying a relationship of T=2t.
Figure 2C:
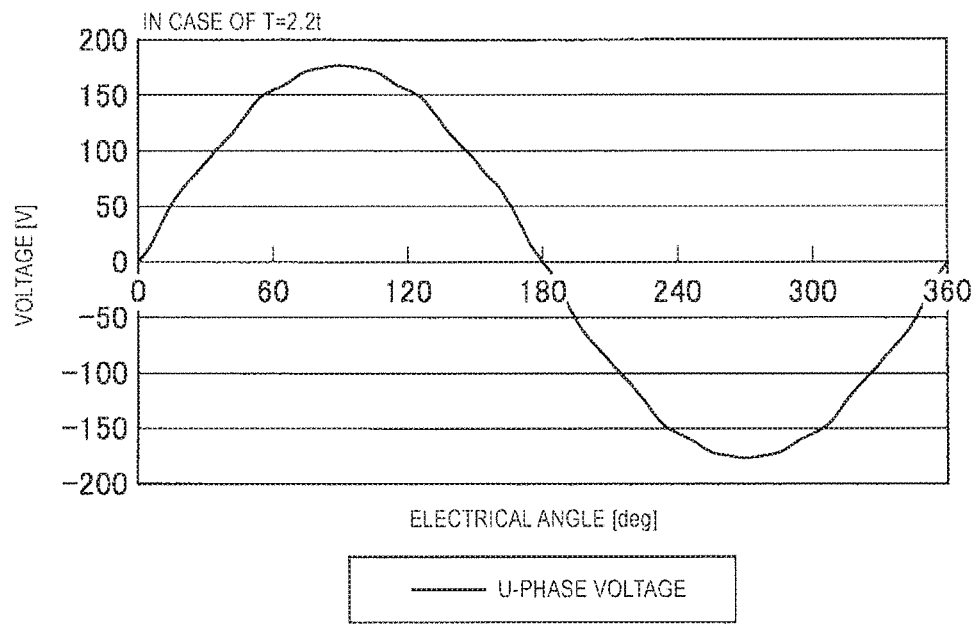
FIG. 2C is an induced voltage waveform diagram in a case where the slit and the flux barrier of the rotor are formed at a position satisfying a relationship of T=2.2t.
Figure 3A:
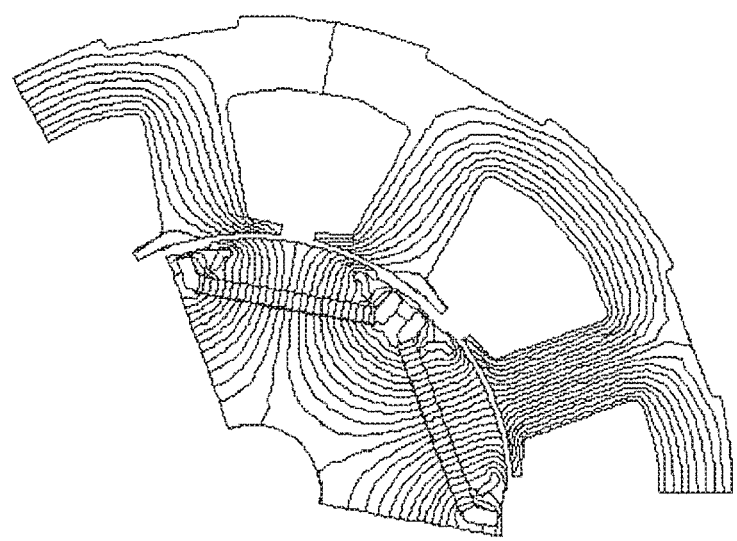
FIG. 3A is a magnetic flux line diagram illustrating changes in magnetic flux lines when the rotor illustrated in FIG. 1 rotates inside a stator.
Figure 3B:
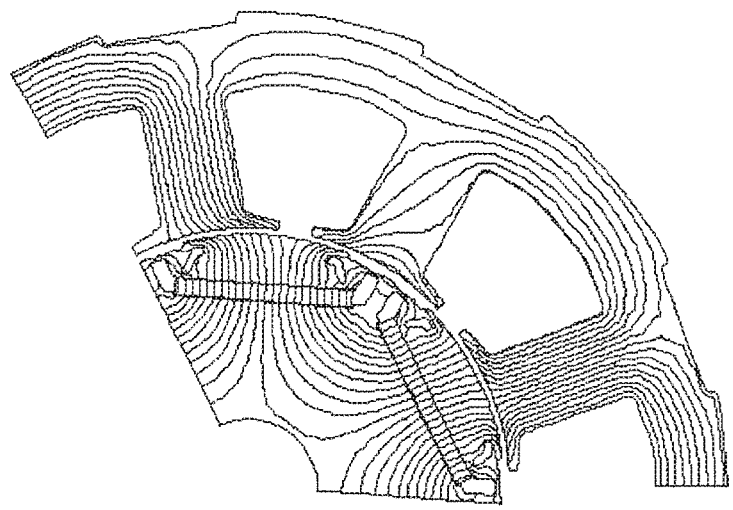
FIG. 3B is a magnetic flux line diagram illustrating changes in magnetic flux lines when the rotor illustrated in FIG. 1 rotates inside the stator.
Figure 3C:
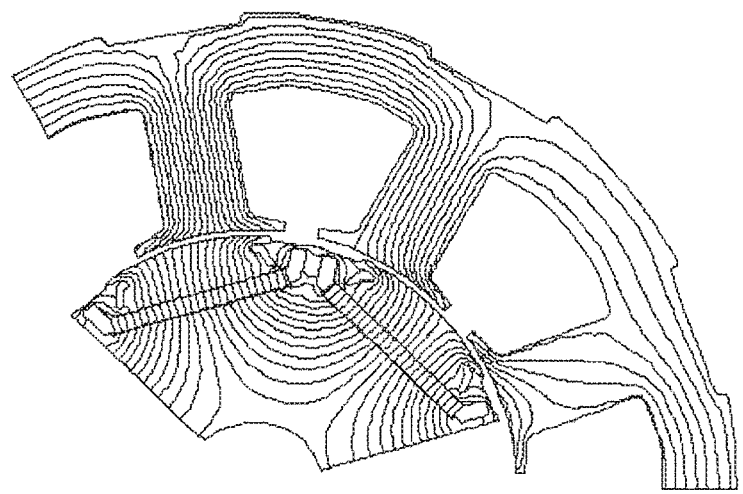
FIG. 3C is a magnetic flux line diagram illustrating changes in magnetic flux lines when the rotor illustrated in FIG. 1 rotates inside the stator.
Figure 3D:
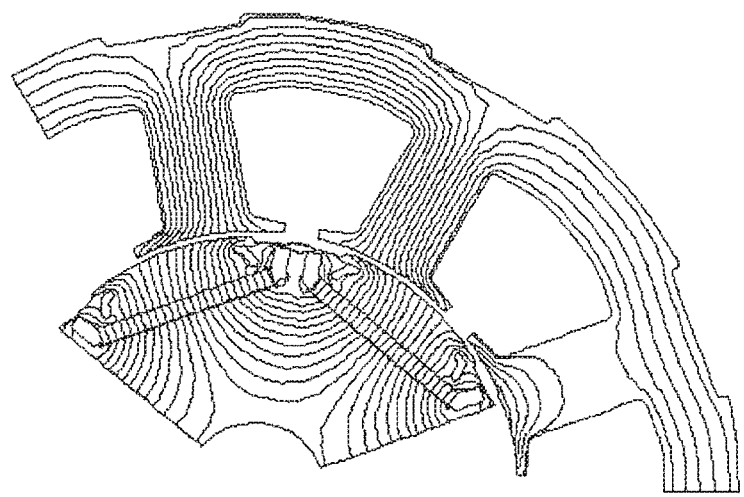
FIG. 3D is a magnetic flux line diagram illustrating changes in magnetic flux lines when the rotor illustrated in FIG. 1 rotates inside the stator.

FIG. 1 is a plan view illustrating a configuration of a permanent magnet electric motor according to the present example. FIG. 2A is an enlarged view of an inter-pole portion of a rotor illustrated in FIG. 1. FIG. 2B is an induced voltage waveform diagram in a case where a slit and a flux barrier of the rotor are formed at a position satisfying a relationship of T=2t. FIG. 2C is an induced voltage waveform diagram in a case where the slit and the flux barrier of the rotor are formed at a position satisfying a relationship of T=2.2t. FIGS. 3A to 3D are magnetic flux line diagrams illustrating changes in magnetic flux lines when the rotor illustrated in FIG. 1 rotates inside a stator.

Rotor of the Present Example

As illustrated in FIG. 1, a permanent magnet electric motor 40 according to the present example is provided with a rotor iron core 22 which is formed in a cylindrical shape by laminating a plurality of silicon steel sheets as soft magnetic body steel sheets, and a plurality of magnet embedding holes 12a, 12b, 12c, 12d, 12e and 12f which are annularly formed in a circumferential direction of the rotor iron core 22 at predetermined intervals. The permanent magnet electric motor 40 includes a rotor 10 provided centering on a rotation shaft 21, and a stator 30 surrounding an outer circumference of the rotor 10. In the stator 30, nine teeth 32 which are disposed from the outer circumference of the rotor 10 with a predetermined air gap therebetween and extend inward from an annular yoke 31 are formed at intervals of 40 deg (mechanical angle), and tip edges 33 protrude from tips of the teeth 32 in the circumferential direction.

In the rotor 10 according to the present example, permanent magnets 13a, 13b, 13c, 13d, 13e and 13f are respectively embedded in the magnet embedding holes 12a to 12f formed in the rotor iron core 22. In order to prevent magnetic-flux short circuiting, voids as first nonmagnetic portions, that is, flux barriers 14a to 14f and 15a to 15f are formed at both ends of the magnet embedding holes 12a to 12f (both ends of the magnet embedding holes extending in the circumferential direction of the rotor iron core 22). The flux barriers 14a to 14f and 15a to 15f as the first nonmagnetic portions are disposed toward the outer circumference of the rotor 10. Notch portions 16a to 16f and 17a to 17f are formed on the outer circumference of the rotor 10 opposing the first nonmagnetic portions in a diameter direction of the rotor 10. Consequently, salient poles 11a to 11f are formed on outer circumferential sides of the magnet embedding holes 12a to 12f.

According to the present example, in the rotor 10, protrusions 18a to 18f protruding outward may be respectively formed between the notch portions 17a and 16b, between the notch portions 17b and 16c, between the notch portions 17c and 16d, between the notch portions 17d and 16e, between the notch portions 17e and 16f, and between the notch portions 17f and 16a. If the notch portions 16a to 16f and 17a to 17f, and the protrusions 18a to 18f are formed on the outer circumference of the rotor 10, harmonic components of an induced voltage generated by the permanent magnets 13a to 13f are reduced so that an induced voltage waveform becomes similar to a sine wave, and thus cogging torque is reduced as in JP-A-2012-120326. However, as in an induced voltage waveform illustrated in FIG. 14B, the waveform has horns around the peak and bottom, and thus vibration or noise during rotation of the electric motor cannot be sufficiently reduced.

Therefore, in the present example, the notch portions 16a to 16f and 17a to 17f and the protrusions 18a to 18f are formed on the outer circumference of the rotor 10, and slits 19a to 19f and 20a to 20f as second nonmagnetic portions which are disposed to be adjacent to the flux barriers 14a to 14f and 15a to 15f are formed at the salient poles 11a to 11f.

Specifically, the slits 19a to 19f and 20a to 20f are formed at the salient poles 11a to 11f so as to be adjacent to the flux barriers 14a to 14f and 15a to 15f at both ends of the salient poles 11a to 11f. A shape and arrangement of the slit 20f will be described by using the slit 20f illustrated in FIG. 2A. The slit 20f of the rotor 10 according to the present example is formed of a first hole part 20f-1 disposed toward the rotor outer circumference from the end vicinity of the magnet embedding hole 12f, an outer circumferential side end part bent along the outer circumference of the rotor at a bent part 20f-3, and a second hole part 20f-2 further extending. Since the slits 19a to 19f and 20a to 20f configured in the above-described way are combined with the rotor provided with the notch portions 16a to 16f and 17a to 17f and the protrusions 18a to 18f, it is possible to remove the horns occurring around the peak and the bottom of the induced voltage waveform, which cannot be removed with only the notch portions and the protrusions, and thus to obtain a waveform similar to a sine wave.

The first hole part 20f-1 is inclined and disposed to become distant from the flux barrier 15f toward the outer circumference when disposed toward the rotor outer circumference from the end vicinity of the magnet embedding hole 12f (that is, when disposed toward the outer circumference from the inner circumference of the rotor).

An inclination of the first hole part 20f-1 of the slit 20f of the present example is formed to be parallel to an inclination of a notch surface 17f-1 of the notch portion 17f as illustrated in FIG. 2A, and the second hole part 20f-2 is formed to be parallel to the outer circumference 10a. In other words, the slit 20f of the rotor of the present example is inclined so that a bent angle thereof (an angle formed between the first hole part 20f-1 and the second hole part 20f-2) matches an angle of the notch portion 17f (an angle formed between the outer circumference 10a of the rotor 10 and the notch surface 17f-1). A gap between a second hole part 19a-2 of the slit 19a and the outer circumference 10a is indicated by T (a gap between the second hole part 20f-2 of the slit 20f and the outer circumference 10a is also indicated by T); a gap between a first hole part 19a-1 of the slit 19a and an extension line (dashed line) of a notch surface 16a-1 of the notch portion 16a is indicated by T' (a gap between the first hole part 20f-1 of the slit 20f and an extension line of the notch surface 17f-1 of the notch portion 17f is also indicated by T'); a gap between a root of the first hole part 20f-1 of the slit 20f and the flux barrier 15f is indicated by L; and an angle from a central line P between (an inter-pole portion) the salient poles 11f and 11a adjacent to each other to the bent part 20f-3 is indicated by θ2. An angle from the central line P to a tip part of the second hole part 20f-2 of the slit 20f is indicated by θ1. A gap of a bridge between the flux barrier 14a and the notch portion 16a is indicated by t (a gap of a bridge between the flux barrier 15f and the notch portion 17f is also indicated by t). The Example illustrated in FIG. 2A corresponds to a base model, in which T=1.0 mm, T'=1.1 mm, and L=1.1 mm are set. A relationship of T=2.2t is assumed to be satisfied, and θ1−θ2=8.55 deg (electrical angle) is set.

FIG. 2B illustrates an induced voltage waveform in a case where the slit and the flux barrier of the rotor are formed at a position satisfying a relationship of T=2t. FIG. 2C illustrates an induced voltage waveform in a case where the slit and the flux barrier of the rotor are formed at a position satisfying a relationship of T=2.2t. Both of the waveforms are similar to a sine wave compared with the waveform illustrated in FIG. 14B. Particularly, in a case where the relationship of T=2.2t illustrated in FIG. 2C is satisfied, a smooth waveform similar to a sine wave is obtained. Consequently, harmonic components of an induced voltage generated by the permanent magnets are reduced so that cogging torque is also reduced, and thus vibration or noise of the electric motor is reduced.

Figure 14A:
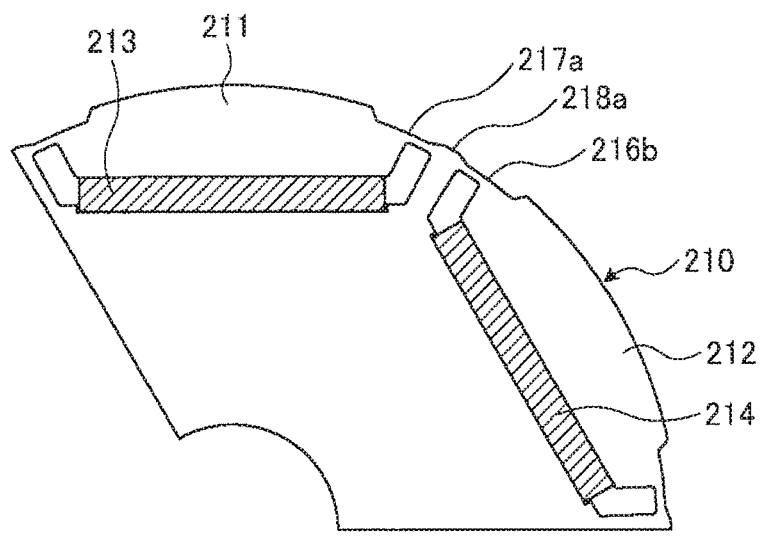
FIG. 14A is a plan view illustrating one configuration example of a rotor of the related art.
Figure 14B:
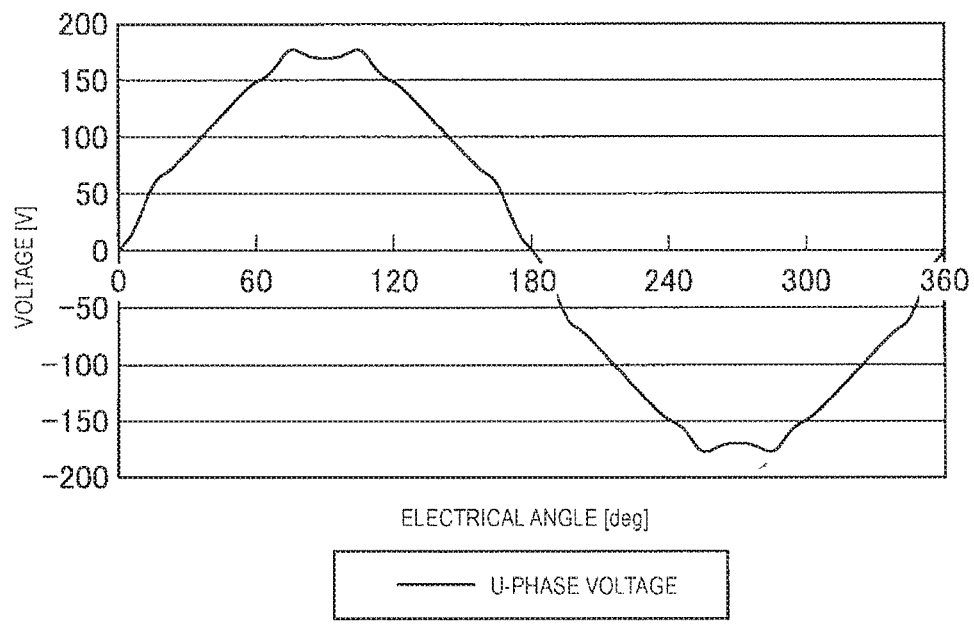
FIG. 14B is a U-phase induced voltage waveform diagram during rotation of a permanent magnet electric motor using the rotor illustrated in FIG. 14A.
Figure 15A:
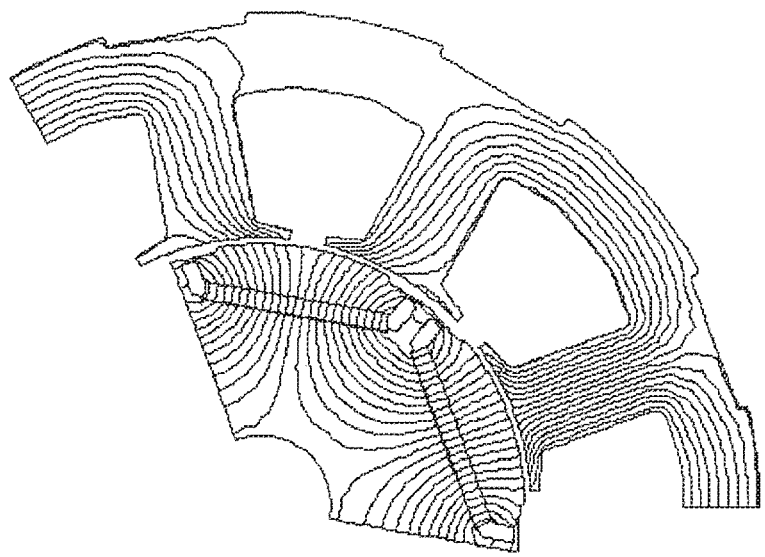
FIG. 15A is a magnetic flux line diagram illustrating changes in magnetic flux lines when the rotor illustrated in FIG. 14A rotates inside a stator.
Figure 15B:
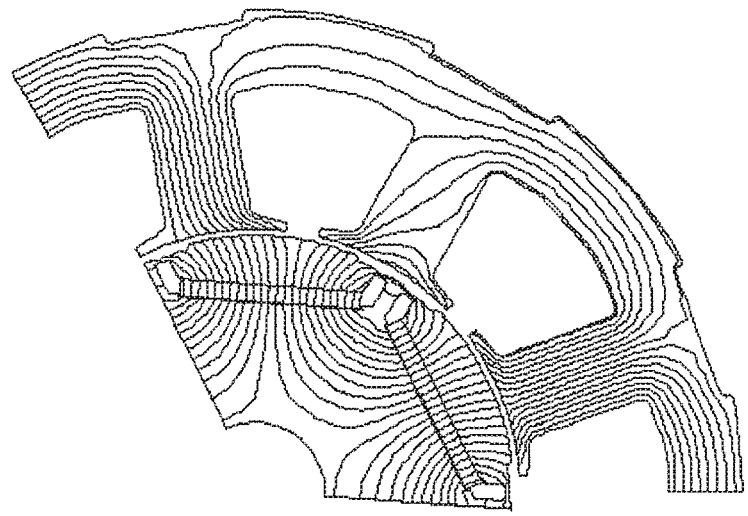
FIG. 15B is a magnetic flux line diagram illustrating changes in magnetic flux lines when the rotor illustrated in FIG. 14A rotates inside the stator.
Figure 15C:
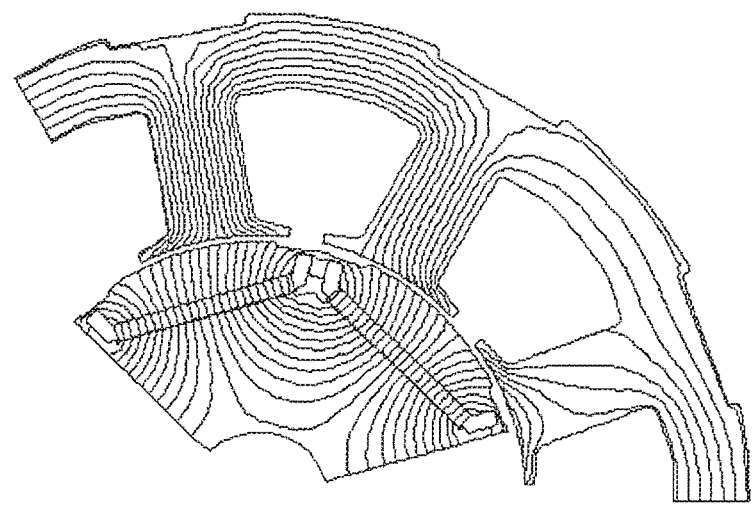
FIG. 15C is a magnetic flux line diagram illustrating changes in magnetic flux lines when the rotor illustrated in FIG. 14A rotates inside the stator.
Figure 15D:
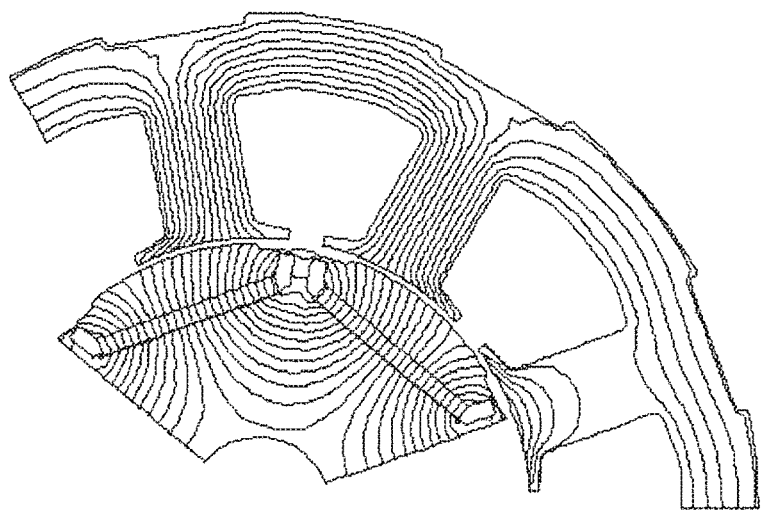
FIG. 15D is a magnetic flux line diagram illustrating changes in magnetic flux lines when the rotor illustrated in FIG. 14A rotates inside the stator.

The relationship of T=2.2t is satisfied in the base model illustrated in FIG. 2A, but, as a result of simulation performed by variously changing the gaps T and t, the harmonic components and the cogging torque change as follows:

In other words, in a case of T=t: the harmonic components=3.58%, and the cogging torque=0.06 Nm in a case of T=1.5t: the harmonic components=2.79%, and the cogging torque=0.10 Nm in a case of T=2t: the harmonic components=2.42%, and the cogging torque=0.20 Nm in a case of T=2.2t: the harmonic components=2.31%, and the cogging torque=0.23 Nm in a case of T=2.5t: the harmonic components=2.62%, and the cogging torque=0.28 Nm in a case of T=3t: the harmonic components=3.39%, and the cogging torque=0.31 Nm The harmonic components in FIG. 14A illustrating a case where the slit is not provided are 4.06% as illustrated in FIG. 14B. Here, according to the results, the slit is provided, and thus the harmonic components are reduced. If the harmonic components are 3% or less, a reduction effect of 1% or more can be achieved compared with a case where the slit is not provided. If a range of T causing the harmonic components to be equal to or less than 3% is obtained, the following expression is satisfied.

$$1.5t \leq T \leq 2.5t$$

Therefore, the slit is preferably formed at a position where T satisfies this relationship.

When magnetic flux lines (illustrated in FIGS. 3A to 3D) obtained when the rotor according to the present example rotates inside the stator are compared with magnetic flux lines (illustrated in FIGS. 15A to 15D) obtained when the rotor of the related art provided with the notch portions and the protrusions rotates inside the stator, in a case of the present example in which the slit is formed, magnetic fluxes generated from the permanent magnets concentrate on the centers of the salient poles by the slit as illustrated in FIGS. 3A to 3D, and thus magnetic fluxes flowing through the teeth sides (refer to the reference numeral 32 in FIG. 1) increase at the centers of the salient poles but decrease on the inter-pole portion sides. Consequently, an induced voltage waveform becomes a sine waveform, and thus harmonic components are reduced.

Figure 4:
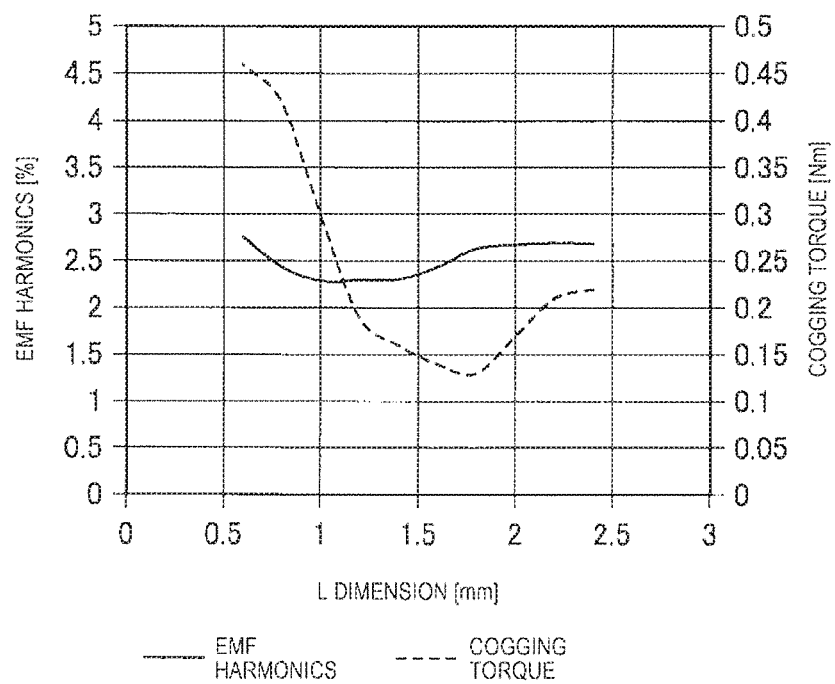
FIG. 4 is a line diagram illustrating changes in harmonic components of an induced voltage waveform and cogging torque when changing a dimension of a gap L between a root of a first hole part of the slit and the flux barrier illustrated in FIG. 2A.
Figure 5:
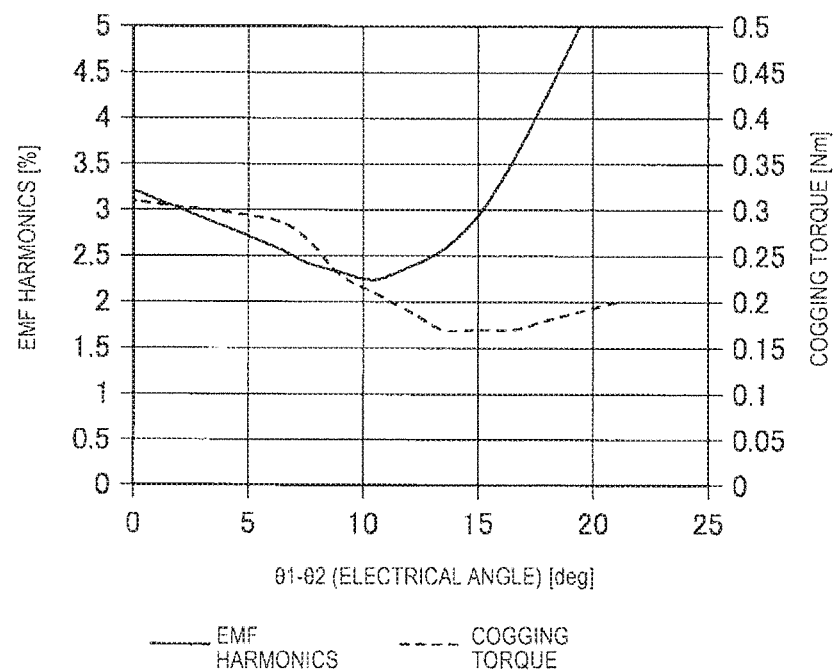
FIG. 5 is a line diagram illustrating changes in harmonic components of an induced voltage waveform and cogging torque when changing a length of a second hole of the slit illustrated in FIG. 2A.

In case of changing length of second hole part FIG. 4 is a line diagram illustrating changes in harmonic components of an induced voltage waveform and cogging torque when changing only a dimension of the gap L between the root of the first hole part of the slit and the flux barrier illustrated in FIG. 2A. FIG. 5 is a line diagram illustrating changes in harmonic components of an induced voltage waveform and cogging torque when changing a length of the second hole part of the slit illustrated in FIG. 2A.

FIG. 4 illustrates changes in the harmonic components (EMF harmonics [%]) of an induced voltage waveform and the cogging torque [Nm] when only a dimension of the gap L between the root of the first hole part 20f-1 of the slit 20f and the flux barrier 15f is changed to 0.6 mm to around 2.4 mm with respect to the base model illustrated in FIG. 2A. Since T' is fixed, a position of the notch surface 16a-1 is also changed due to the change of L. In FIG. 4, a solid line indicates EMF harmonics, and a dashed line indicates cogging torque. According to the line diagram shown in FIG. 4, the cogging torque is 0.3 Nm or less, and the EMF harmonics are 3% or less in the entire range, at L of 1 mm or more. The EMF harmonics are 2.5% or less at L in the range of 0.75 mm to 1.7 mm. Thus, L is preferably 1 mm to 1.7 mm, and, particularly, L is more preferably around 1.1 mm at which the EMF harmonics are low, and intersection with the line of the cogging torque occurs.

FIG. 5 illustrates changes in the harmonic components (EMF harmonics [%]) of an induced voltage waveform and the cogging torque [Nm] when only θ1-θ2 (electrical angle) [deg] is changed to 0 deg to around 20 deg with respect to the base model illustrated in FIG. 2A. Also in FIG. 5, a solid line indicates EMF harmonics, and a dashed line indicates cogging torque. According to the line diagram shown in FIG. 5, the EMF harmonics are 3% or less at the electrical angle θ1-θ2 in the range of 2.5 deg to 15 deg. The cogging torque is 0.3 Nm or less at the electrical angle θ1-θ2 of 2.5 deg or more. Thus, the electrical angle θ1-θ2 preferably has the range of 2.5 deg to 15 deg. In other words, as illustrated in FIG. 6A, in a case where the bent tip parts of the slits 20f and 19a illustrated in FIG. 2A further extend, the slits are preferably formed in the preferable range of L illustrated in FIG. 4 and the range of the electrical angle θ1-θ2 illustrated in FIG. 5.

Figure 6A:
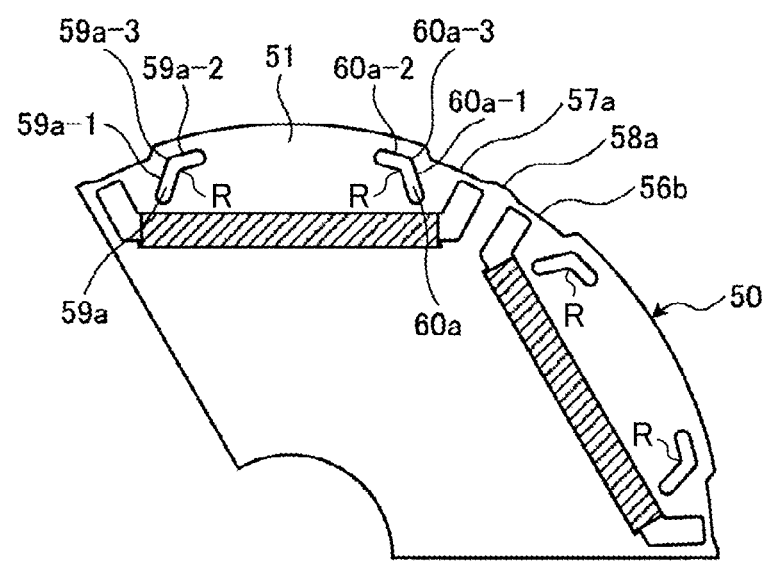
FIG. 6A is a plan view of a rotor as a comparative example in which a bent tip part of the slit illustrated in FIG. 2A is lengthened.
Figure 6B:
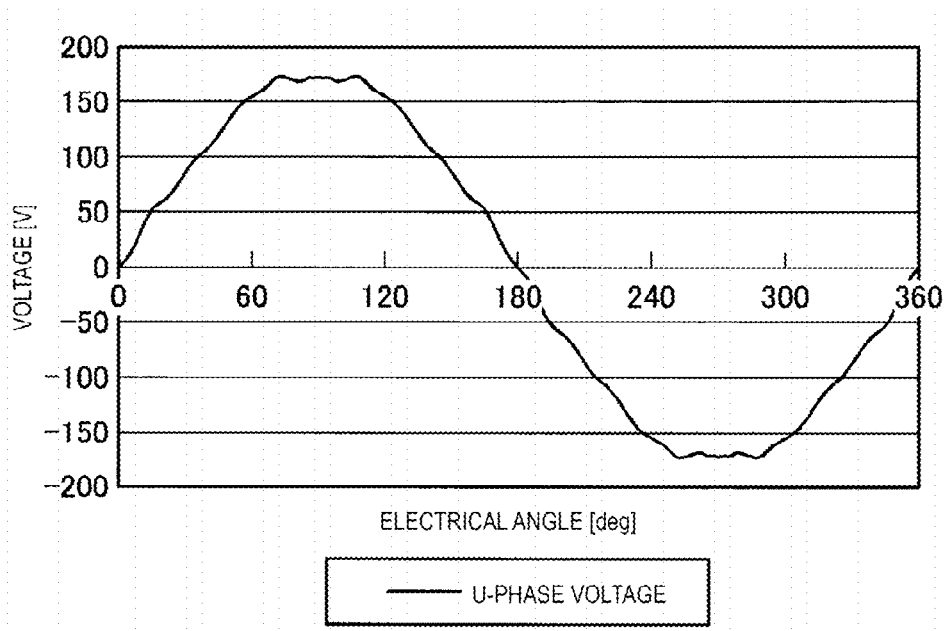
FIG. 6B is a U-phase induced voltage waveform diagram in the rotor illustrated in FIG. 6A.
Figure 7A:
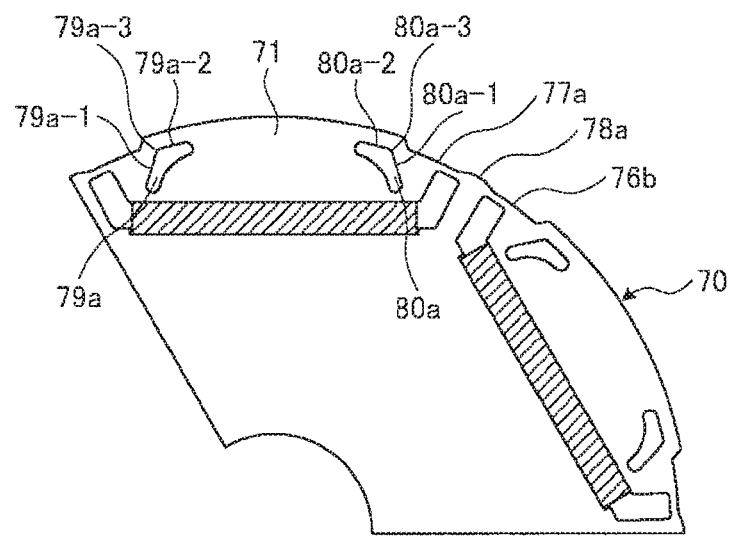
FIG. 7A is a plan view of a rotor as a comparative example in which an inner circumferential side R of a bent portion of the slit illustrated in FIG. 6A is made large.
Figure 7B:
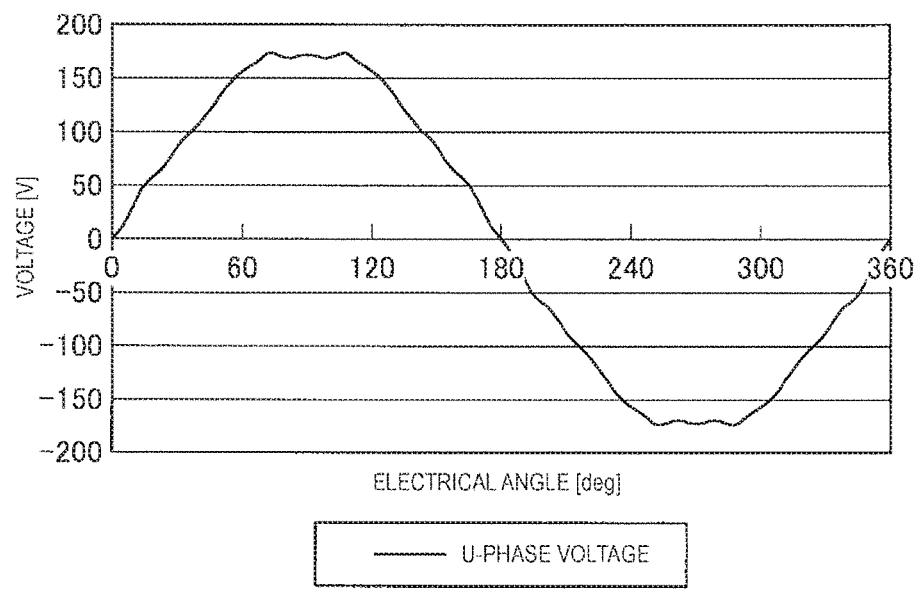
FIG. 7B is a U-phase induced voltage waveform diagram in the rotor illustrated in FIG. 7A.

Example in which Inner Circumferential Side R of Bent Part of Slit Illustrated in FIG. 6A is Made Large A slit shape illustrated in FIG. 7A is substantially the same as the slit shape illustrated in FIG. 6A, but is different therefrom in that inner circumferential sides of bent parts 79a-3 and 80a-3 are formed in an arc shape. An obtained induced voltage waveform is illustrated in FIG. 7B, the harmonic components are 2.88%, and the cogging torque is 0.33 Nm. Therefore, it is possible to achieve substantially the same effect as in the case of FIG. 6A. In other words, a change of a slit area of the bent inner circumferential side hardly influences an induced voltage waveform or characteristics.

Example in which Slit is Formed in C Shape without being Bent

Figure 8A:
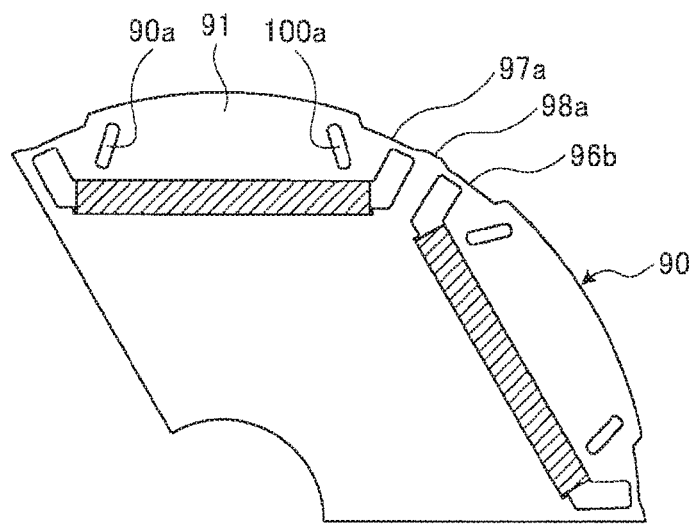
FIG. 8A is a plan view of a rotor as a comparative example in which the slits illustrated in FIG. 2A are formed in a V shape without bending the tip parts thereof.
Figure 8B:
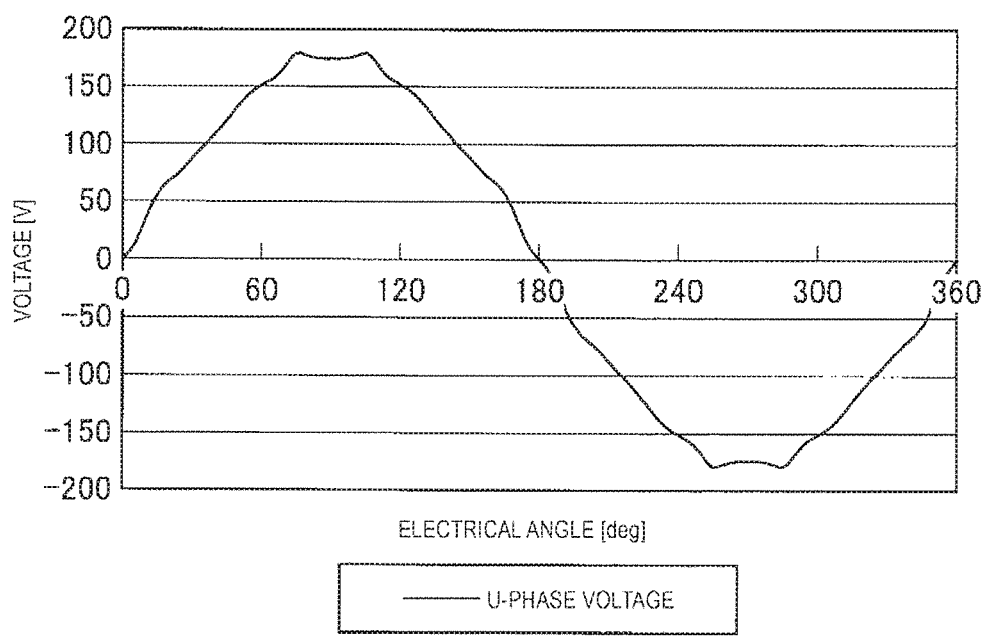
FIG. 8B is a U-phase induced voltage waveform diagram in the rotor illustrated in FIG. 8A.
Figure 9A:
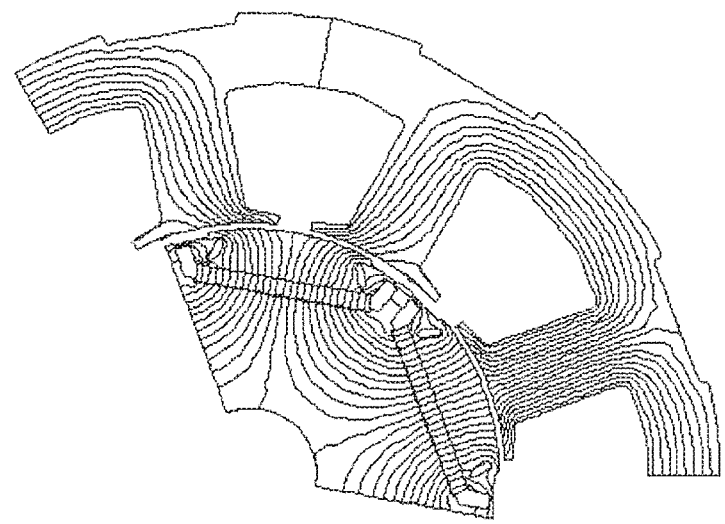
FIG. 9A is a magnetic flux line diagram illustrating changes in magnetic flux lines when the rotor illustrated in FIG. 8A rotates inside the stator.
Figure 9B:
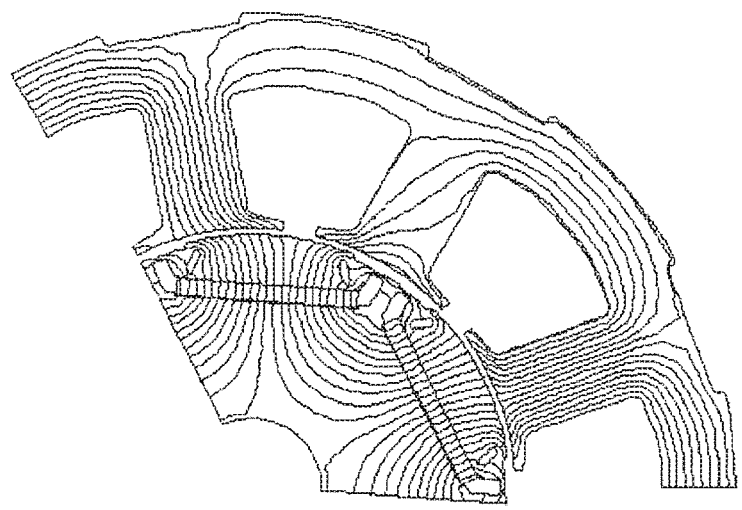
FIG. 9B is a magnetic flux line diagram illustrating changes in magnetic flux lines when the rotor illustrated in FIG. 8A rotates inside the stator.
Figure 9C:
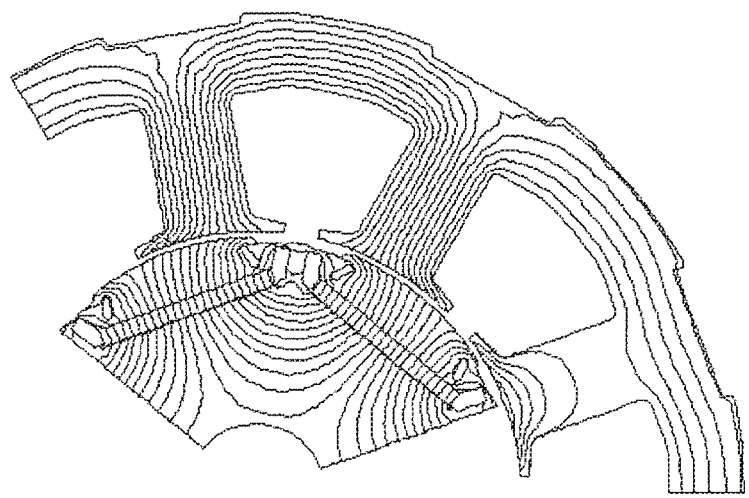
FIG. 9C is a magnetic flux line diagram illustrating changes in magnetic flux lines when the rotor illustrated in FIG. 8A rotates inside the stator.
Figure 9D:
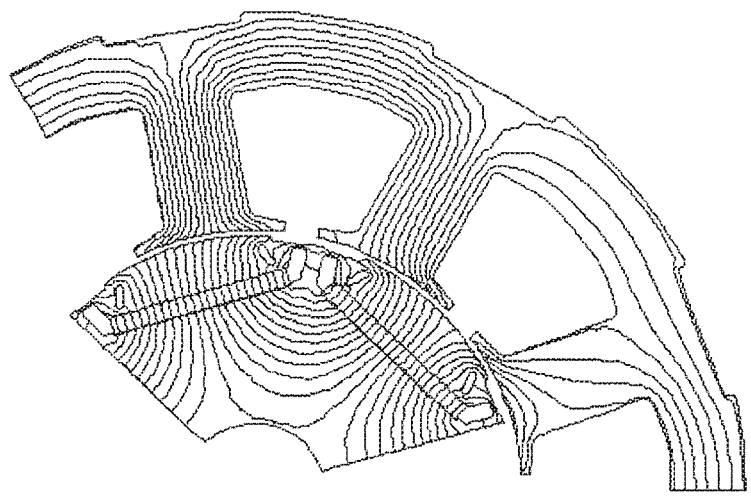
FIG. 9D is a magnetic flux line diagram illustrating changes in magnetic flux lines when the rotor illustrated in FIG. 8A rotates inside the stator.

FIG. 8A illustrates a rotor as a comparative example in which slits 90a and 100a of a rotor 90 are formed in a V shape without bending tip parts thereof unlike the rotor illustrated in FIG. 2A. A waveform illustrated in FIG. 8B corresponds to an induced voltage waveform in a case where the tip parts of the slits are not bent unlike the slits of the rotor illustrated in FIG. 2A. In an induced voltage waveform, the rotor 90 illustrated in FIG. 8A is provided with notch portions 97a and 96b and a protrusion 98a between the notch portions, but a shape of the slits 90a and 100a combined therewith is a V shape, and thus the harmonic components are 3.22%, and the cogging torque is 0.31 Nm.

The magnetic flux lines (illustrated in FIGS. 3A to 3D) obtained when the rotor illustrated in FIG. 2A rotates inside the stator are compared with magnetic flux lines (illustrated in FIGS. 9A to 9D) obtained when the rotor in which the notch portions and the protrusions are combined with the V-shaped slits rotates inside the stator. In FIGS. 3A to 3D illustrating the bent slits, the bent parts of the slits further suppress divergence of magnetic fluxes generated from the permanent magnets so that magnetic fluxes flowing toward the teeth sides are uniformized, and thus harmonic components of an induced voltage waveform are reduced. In contrast, in a case where the slits are not bent in a V shape, the slit portions suppress divergence of magnetic fluxes generated from the permanent magnets to some extent so that magnetic fluxes flowing toward the teeth sides are uniformized, but the bent slits more reduce harmonic components of an induced voltage waveform.

Figure 10A:
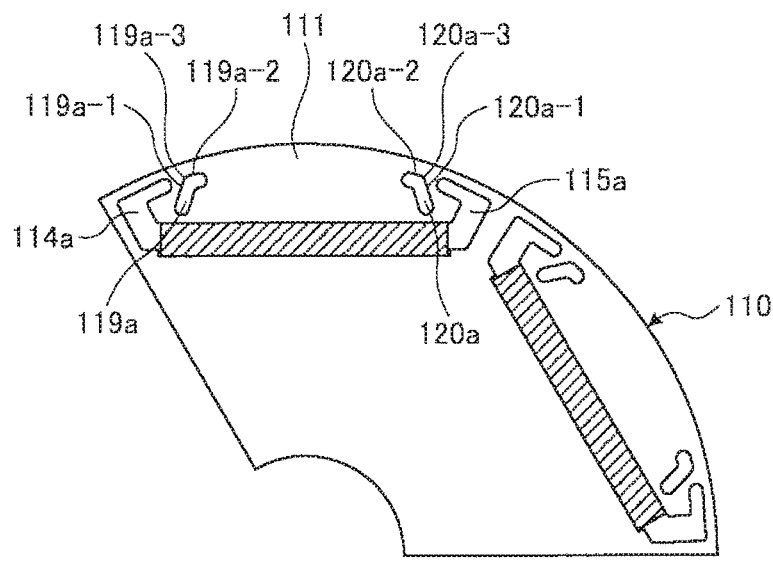
FIG. 10A is a plan view of a rotor as a comparative example in which there are no notch portion and protrusion on an outer circumference between salient poles adjacent to each other, and a slit in which a tip part of a nonmagnetic portion extends and is bent inward in a circumferential direction is formed around both ends of each of salient poles.
Figure 10B:
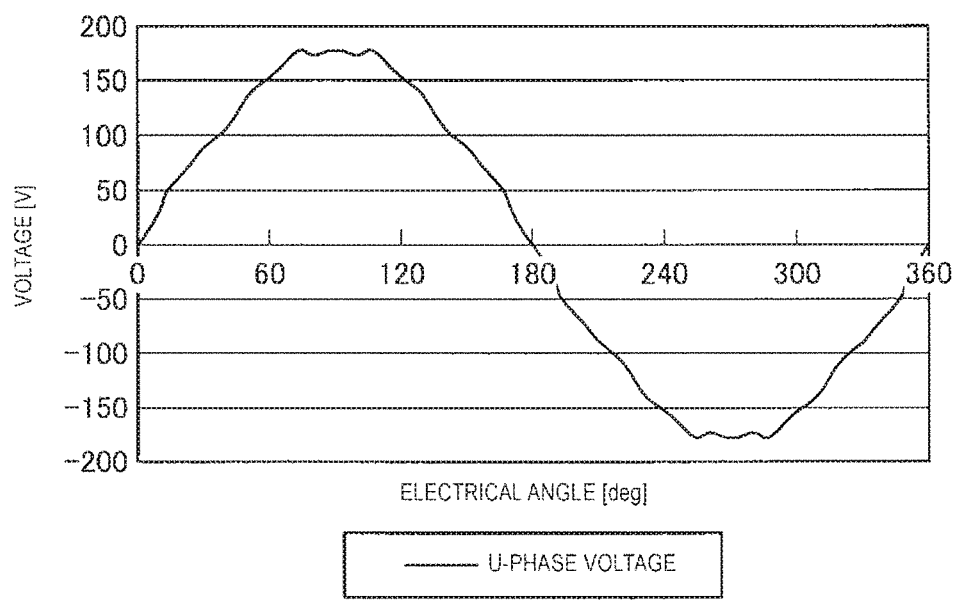
FIG. 10B is a U-phase induced voltage waveform diagram in the rotor illustrated in FIG. 10A.

Comparative example in which there is no notch portion and protrusion, tip part of flux barrier extends inward in circumferential direction, and bent slits are formed around both ends of salient pole As illustrated in FIG. 10A, in a case where a rotor 110 has no notch portion and protrusion on an outer circumference thereof, and thus has a perfectly circular shape, the tendency that cogging torque characteristics deteriorate is observed. In characteristics of the rotor 110 illustrated in FIG. 10A, the harmonic components are 3.23%, and the cogging torque is 0.57 Nm. In the rotor 110 illustrated in FIG. 10A, tip parts of flux barriers 114a and 115a extend inward in a circumferential direction, and bent slits 119a and 120a are formed. As can be seen from an induced voltage waveform illustrated in FIG. 10B, two horns appear around each of a peak and a bottom, and thus the waveform is not similar to a sine wave.

Figure 11A:
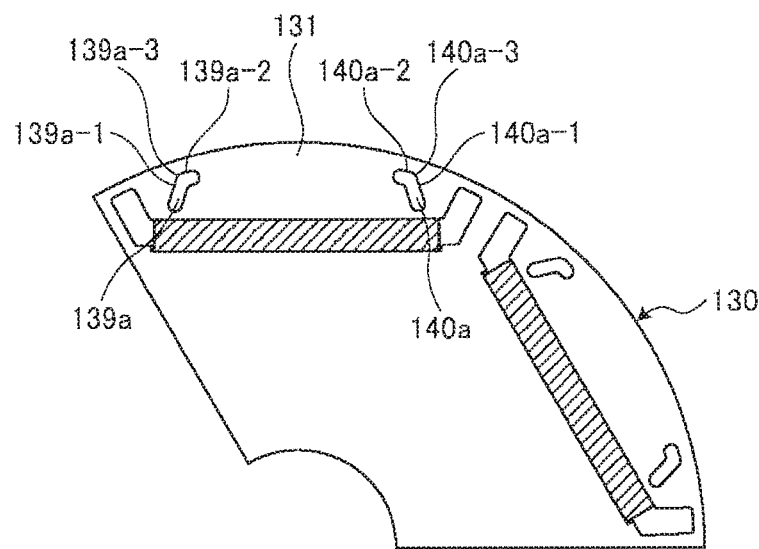
FIG. 11A is a plan view of a rotor as a comparative example in which there are no notch portion and protrusion on an outer circumference between salient poles adjacent to each other, and a slit having the same shape as in FIG. 2A is formed at the same position.
Figure 11B:
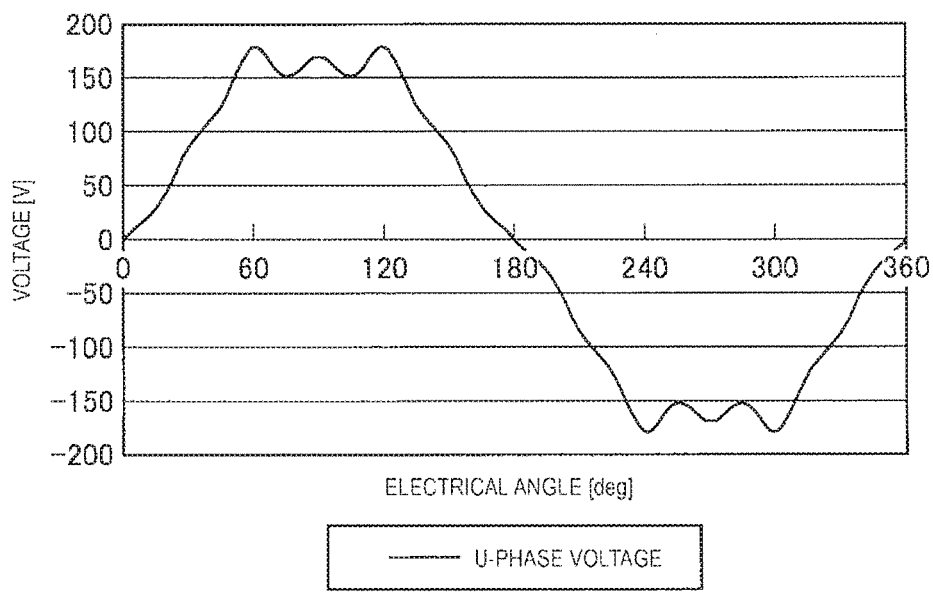
FIG. 11B is a U-phase induced voltage waveform diagram in the rotor illustrated in FIG. 11A.

Comparative Example in which Slits Having the Same Shape as in the Present Example (FIG. 2A) are Formed without Notch Portion and Protrusion In a rotor 130 illustrated in FIG. 11A, slits are formed in the same shape as the shape of the slits of the rotor 10 of the present example at the same position, and there are no notch portion and protrusion on an outer circumference thereof. In this case, characteristics of the rotor are checked. In a case where there is no notch portion on the outer circumference, as can be seen from an induced voltage waveform illustrated in FIG. 11B, the waveform is considerably different from a sine wave. Characteristics of the rotor 130 illustrated in FIG. 11A notably deteriorate since the harmonic components are 10.62%, and the cogging torque is 0.58 Nm. As mentioned above, in a case where there are no notch portion and protrusion on the outer circumference of the rotor, effects of the slits cannot be achieved even if the same slits as in the present example illustrated in FIG. 2A are formed.

Example in which Tip Part of Slit is Bent in Inner Circumferential Direction

Figure 12A:
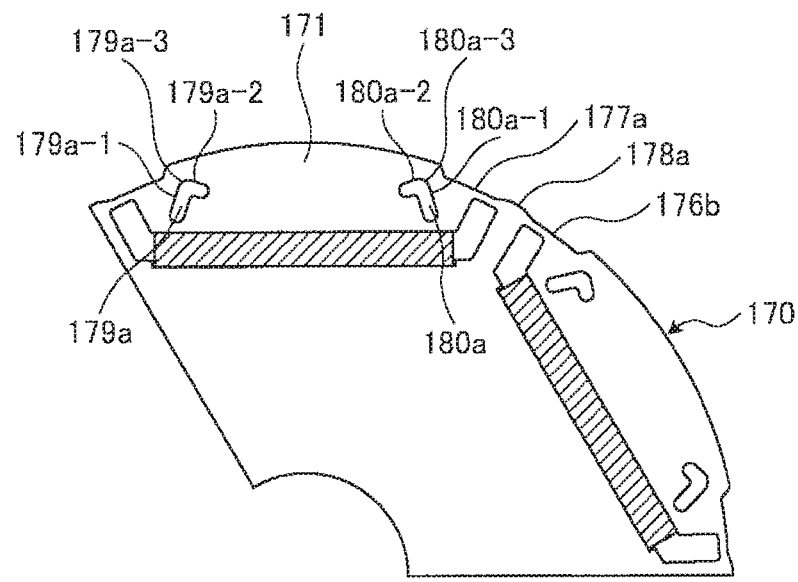
FIG. 12A is a plan view of a rotor as Example in which the tip part of the slit illustrated in FIG. 2A is bent in an inner circumferential direction.
Figure 12B:
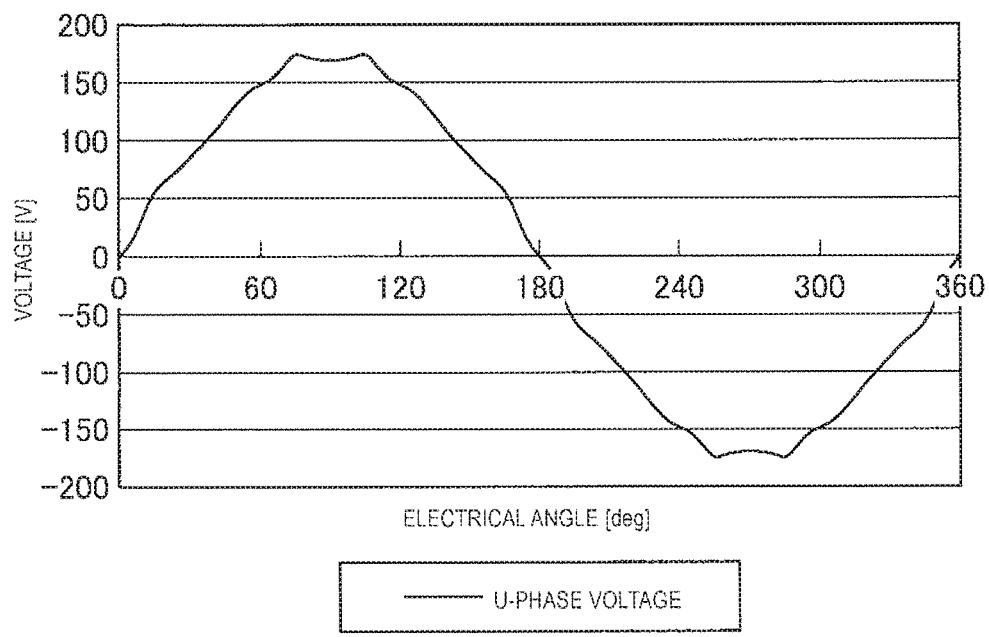
FIG. 12B is a U-phase induced voltage waveform diagram in the rotor illustrated in FIG. 12A.

A rotor 170 illustrated in FIG. 12A is the same as the rotor illustrated in FIG. 2A in that notch portions 177a and 176b and a protrusion 178a are formed on an outer circumference thereof, and first hole parts 179a-1 and 180a-1 of slits 179a and 180a are the same as those of the slits illustrated in FIG. 2A, but the slits are different therefrom in that tip parts of the slits are bent from bent parts 179a-3 and 180a-3 and extend in an inner circumferential direction and thus second hole parts 179a-2 and 180a-2 are formed. In other words, bent angles of the second hole parts 179a-2 and 180a-2 of the slits 179a and 180a are changed. As illustrated in FIG. 12B, an induced voltage waveform in this case has two horns around each of a peak and a bottom, and thus is not similar to a sine wave. As characteristics of the rotor, the harmonic components are 3.18%, and the cogging torque is 0.30 Nm. As mentioned above, the characteristics change just by changing the bent angles of the second hole parts 179a-2 and 180a-2 of the slits illustrated in FIG. 2A.

Example in which Triangular Slit is Formed

Figure 13A:
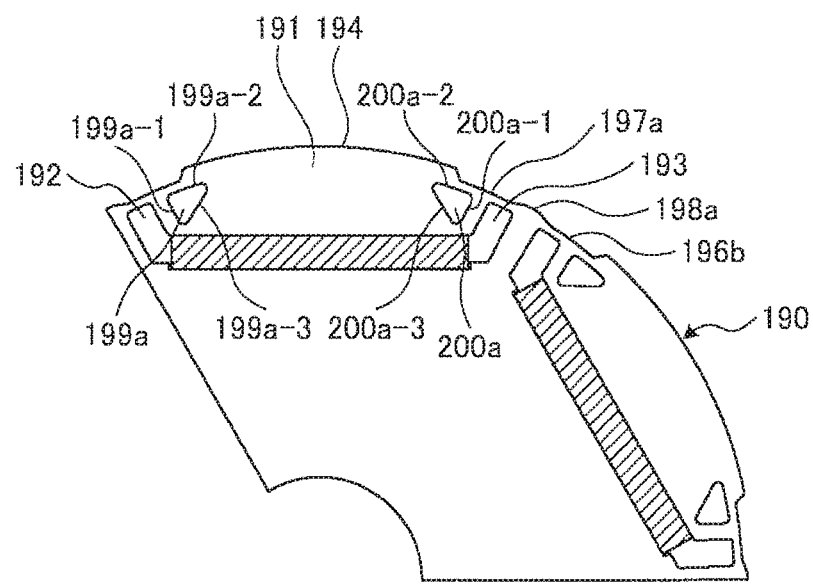
FIG. 13A is a plan view of a rotor as Example in which a triangular slit is formed to be parallel to the nonmagnetic portion and the outer circumference around both ends of each of the salient poles.
Figure 13B:
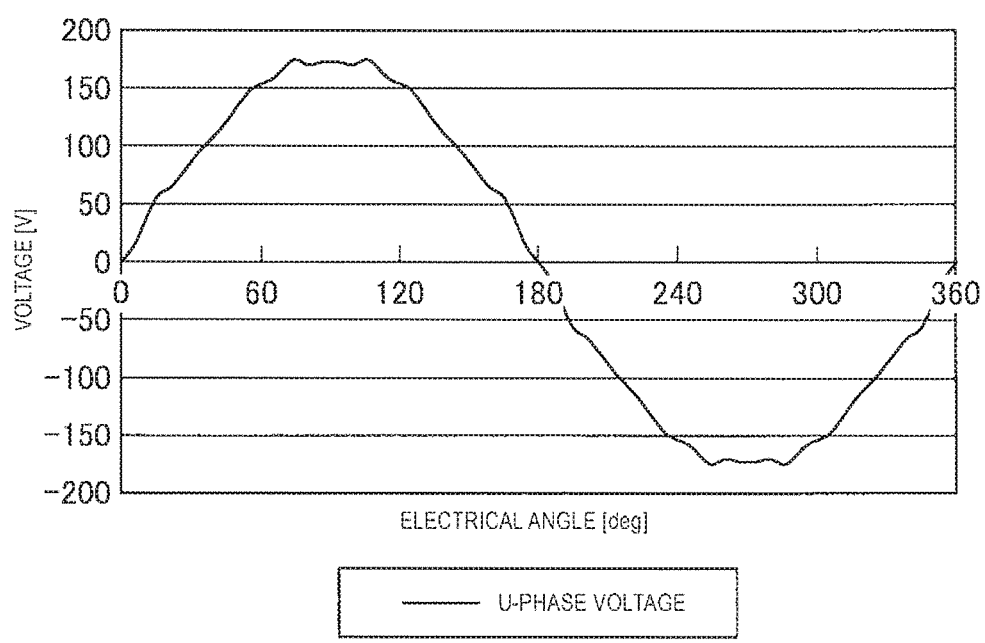
FIG. 13B is a U-phase induced voltage waveform diagram in the rotor illustrated in FIG. 13A.

In a rotor 190 illustrated in FIG. 13A, notch portions 197a and 196b and a protrusion 198a are formed on an outer circumference thereof, and triangular slits 199a and 200a are formed at both ends of a salient pole 191. The slits 199a and 200a are formed in a triangular shape by first sides 199a-1 and 200a-1 formed to be parallel to flux barriers 192 and 193, second sides 199a-2 and 200a-2 formed to be parallel to an outer circumference 194, and third sides 199a-3 and 200a-3. An induced voltage waveform for the rotor 190 illustrated in FIG. 13A is illustrated in FIG. 13B, and it is possible to achieve substantially the same effect as in the induced voltage waveform illustrated in FIG. 2C. As characteristics of the rotor 190 illustrated in FIG. 13A, the harmonic components are 2.76%, and the cogging torque is 0.26 Nm.

As described above, in the rotor and the permanent magnet electric motor of the related art, at least the notch portion is provided on the outer circumference of the inter-pole portion of the rotor. In a case where a protrusion is further provided, an induced voltage waveform generated from the permanent magnets of the permanent magnet electric motor becomes similar to a sine wave since harmonic components are reduced. Consequently, cogging torque is reduced, and thus vibration or noise of the electric motor is reduced to some extent. However, in a case where further improvement is intended to be performed, it has not been performed up to now to improve characteristics by using a notch portion or a protrusion and a slit shape, or a combination with arrangement thereof. Particularly, as examined through comparison between the respective Examples and the comparative examples, the effect achieved by providing the notch portion or the protrusion and the effect achieved by providing the slit are not led to a result of simply adding the effects together. Since characteristics may deteriorate depending on a shape or arrangement of the slit, even a person skilled in the art cannot easily conceive of patterning of a specific slit shape or an arrangement position as in the present example.

In the rotor according to the present invention, at least a notch portion may be provided on a rotor outer circumference of an inter-pole portion at which a flux barrier as a first nonmagnetic portion is disposed in an outer circumferential direction of the transport, and a protrusion may be further provided at the inter-pole portion. If harmonic components of an induced voltage generated in conductive wires wound on the teeth by the permanent magnets of the rotor are reduced, an induced voltage waveform becomes similar to a sine wave. The induced voltage waveform becomes similar to a sine wave so that the cogging torque is reduced, and thus uneven rotation is minimized when the rotor rotates. If the uneven rotation is minimized, vibration or noise of the electric motor is reduced. In order to use this phenomenon, in the rotor according to the present invention, the slit as a second nonmagnetic portion is disposed to extent from a position adjacent to the flux barrier in the outer circumferential direction of the rotor. The slit is formed of a first hole part as a long hole extending in the outer circumferential direction, a bent part in which an outer circumferential side tip part of the first hole part is bent along the outer circumference of the rotor from an end of the magnet embedding hole toward the center, and a second hole part further extending along the outer circumference.

The slit of the rotor is inclined so that an angle of the notch portion formed on the rotor outer circumference matches a bent angle of the first hole part of the slit. The second hole part of the slit is bent at the bent part so as to extend in parallel to the rotor outer circumference.

In relation to the slit of the rotor, in a case where a distance between the flux barrier and the notch portion formed on the rotor outer circumference is indicated by t, and a distance between the second hole part of the slit and the rotor outer circumference is indicated by T, the flux barrier and the slit are disposed at positions satisfying the following expression.

$$1.5t \le T \le 2.5t$$

A rotor and a permanent magnet electric motor using the rotor are configured as described above. Therefore, in a case where at least a notch portion is provided on a rotor outer circumference, and also in a case where a protrusion is further provided at an inter-pole portion, an induced voltage waveform generated from permanent magnets of the permanent magnet electric motor can be made to become similar to a sine wave by reliably reducing the harmonic components. Consequently, the cogging torque is reduced. Thus, vibration or noise of the electric motor is reduced.

As Example of the present invention, for example, a description has been made of a case where the permanent magnet electric motor is used for an interior permanent magnet synchronous motor (IPMSM) 40 with six poles including the rotor 10 and the stator 30 as a compressor motor which has a small size and requires strong torque, but the present invention is not necessarily limited thereto. The permanent magnet electric motor of the present invention is applicable to the interior permanent magnet synchronous motor 40 having four or more poles.

As described above, in the rotor and the permanent magnet electric motor according to the present invention, an induced voltage waveform becomes similar to a sine wave so that the cogging torque is reduced, and thus the permanent magnet electric motor is useful as a permanent magnet electric motor which is driven at a high rotation speed, particularly, such as an electric motor built into a compressor.

What is claimed is:

1. A rotor which is cylindrically formed of a magnetic body, the rotor comprising:
   magnet embedding holes formed at predetermined intervals in a circumferential direction of the rotor, each magnet embedding hole having ends and extending from one of the ends to another of the ends;
   plate-like permanent magnets embedded in the magnet embedding holes;

notch portions formed at an outer circumference of the rotor, each notch portion having first and second ends and extending along the circumferential direction of the rotor from the first end to the second end;

first nonmagnetic portions each extending from one of the ends of corresponding one magnet embedding hole toward one of the notch portions; and second nonmagnetic portions disposed adjacent to the first nonmagnetic portions and between the magnet embedding holes and the outer circumference of the rotor, wherein each second nonmagnetic portion is a slotted hole, and each second nonmagnetic portion extends toward corresponding one of the notch portion along the outer circumference of the rotor and redirects away from the outer circumference of the rotor, and wherein one of the areas one of the notch portions is formed to extend, in the circumferential direction of the rotor, from an area near an outer circumferential side end portion of one of the first nonmagnetic portions, to another area between the outer circumferential side end portion of one of the first nonmagnetic portions and an outer circumferential side end portion of one of the second nonmagnetic portions.

2. The rotor according to claim 1, wherein an angle of each notch portion matches a bent angle of an outer circumferential side of each second nonmagnetic portion.

3. A permanent magnet electric motor comprising:
the rotor according to claim 1; and
a stator that is disposed on an outer circumferential side of the rotor,
wherein the stator comprises an annular yoke and a plurality of teeth each extending from the annular yoke toward the rotor, and
wherein conductive wires are respectively wounded on the plurality of teeth.

4. A permanent magnet electric motor comprising:
the rotor according to claim 2; and
a stator that is disposed on an outer circumferential side of the rotor,
wherein the stator comprises an annular yoke and a plurality of teeth each extending from the annular yoke toward the rotor, and
wherein conductive wires are respectively wounded on the plurality of teeth.

5. The rotor according to claim 1, wherein
in a case where a gap between an outer circumferential side end face of the first nonmagnetic portion and an opposing face of the notch portion opposing the outer circumferential side end face is indicated by t, and a gap between an outer circumferential side end face of the outer circumferential side end portion of the second nonmagnetic portion and an outer circumference face of the rotor opposing the outer circumferential side end face is indicated by T, a following expression may be satisfied:

$1.5t \leq T \leq 2.5t$

6. The rotor according to claim 1, wherein
the second nonmagnetic portion includes a first hole part extending from a position opposing a circumferential end portion of each of the magnet embedding holes toward the outer circumference of the rotor, a second hole part embedding by being bended along the outer circumference of the rotor from an outer circumferential side end portion of the first hole part, and a bent part formed between the first hole part and the second hole part, and in a case where a gap between a first nonmagnetic portion side end face in an inner circumferential side end portion of the first hole part of the second nonmagnetic portion and a lateral face of the first nonmagnetic portion opposing the first nonmagnetic portion side end face is indicated by L, a following expression may be satisfied:

$1\text{mm} \leq L \leq 1.7\text{mm}$.

7. The rotor according to claim 6, wherein
in a case where an angle formed between a central line that passes through a center of the rotor and passes through middle of a protrusion in a circumferential direction of the rotor, and a first line that passes through the center of the rotor and passes through a tip of a salient pole side of the second hole part of the second nonmagnetic portion is indicated by $\theta 1$, and an angle formed between the central line and a second line that passes through the center of the rotor and passes through an outer circumferential side of the bent part of the second nonmagnetic portion is indicated by $\theta 2$, an electrical angle calculated by $(\theta 1 - \theta 2)$ may satisfy $2.5 \text{ deg} \leq (\theta 1 - \theta 2) \leq 15 \text{ deg}$.

* * * * *